United States Patent
Darmes et al.

(10) Patent No.: US 8,641,853 B2
(45) Date of Patent: Feb. 4, 2014

(54) METHOD OF TRANSFERRING A PORTION OF A FUNCTIONAL FILM

(75) Inventors: Daniel Darmes, Charenton le Pont (FR); Nicolas Lavillonnière, Charenton le Pont (FR); Christelle Marck, Charenton le Pont (FR); Eric Roussel, Charenton le Pont (FR)

(73) Assignee: Essilor International (compagnie Generale d'optique, Charenton le Pont (FR)

( * ) Notice: Subject to any disclaimer, the term of this patent is extended or adjusted under 35 U.S.C. 154(b) by 282 days.

(21) Appl. No.: 13/054,007

(22) PCT Filed: Jul. 13, 2009

(86) PCT No.: PCT/FR2009/051398
§ 371 (c)(1),
(2), (4) Date: Mar. 28, 2011

(87) PCT Pub. No.: WO2010/010275
PCT Pub. Date: Jan. 28, 2010

(65) Prior Publication Data
US 2011/0174431 A1    Jul. 21, 2011

(30) Foreign Application Priority Data
Jul. 21, 2008 (FR) ..................... 08 54950

(51) Int. Cl.
*B32B 37/12* (2006.01)
*B32B 37/14* (2006.01)
*B32B 37/26* (2006.01)
*B32B 38/04* (2006.01)
*G02C 7/02* (2006.01)
*G02C 7/12* (2006.01)

(52) U.S. Cl.
USPC ........ 156/268; 156/257; 351/41; 351/159.01; 351/159.73

(58) Field of Classification Search
USPC ................................... 156/257, 268
See application file for complete search history.

(56) References Cited

U.S. PATENT DOCUMENTS

| | | | |
|---|---|---|---|
| 4,767,659 A | 8/1988 | Bailey et al. | |
| 5,827,614 A * | 10/1998 | Bhalakia et al. | 428/411.1 |
| 7,808,707 B2 | 10/2010 | Cano et al. | |
| 2004/0228996 A1 | 11/2004 | Franzo | |
| 2005/0109454 A1* | 5/2005 | Katoh et al. | 156/268 |
| 2006/0006336 A1 | 1/2006 | Cano et al. | |
| 2006/0141196 A1 | 6/2006 | Utz | |
| 2006/0230661 A1 | 10/2006 | Bekker | |
| 2010/0316817 A1* | 12/2010 | Kimura et al. | 428/1.31 |
| 2012/0068312 A1* | 3/2012 | Tanaka et al. | 257/620 |
| 2012/0160406 A1* | 6/2012 | Sugimoto et al. | 156/257 |

FOREIGN PATENT DOCUMENTS

| | | |
|---|---|---|
| AU | 619584 | 3/1990 |
| AU | 629504 | 10/1992 |

(Continued)

*Primary Examiner* — Sonya Mazumdar
(74) *Attorney, Agent, or Firm* — Occhiuti & Rohlicek LLP

(57) ABSTRACT

A method of transferring a portion of a functional film (1) onto a substrate from a base plate (100) comprises the formation of a groove (S1) which passes through the said functional film and also a separating film (2) placed between the functional film and the base plate. A portion (2p) of the separating film is then detached from the base plate with the portion of the functional film. The portion of said separating film protects the portion of the functional film in the rest of the method. According to one improvement, the portion of the functional film which is detached from the base plate comprises a useful portion (1p) and a margin (1m) that are connected together by the portion (2p) of the separating film. The useful portion (1p) of the functional film may then be gripped and handled via the margin (1m).

9 Claims, 6 Drawing Sheets

(56) References Cited

FOREIGN PATENT DOCUMENTS

| | | |
|---|---|---|
| AU | 695736 | 8/1998 |
| EP | 0359532 | 3/1990 |
| EP | 1464479 | 10/2004 |
| EP | 1464479 A2 * | 10/2004 |
| FR | 2673299 | 8/1992 |
| WO | 2006/105999 | 10/2006 |
| WO | 2007/133208 | 10/2007 |
| WO | 2007/132116 | 11/2007 |
| WO | 2007/144308 | 12/2007 |
| WO | 2008/000607 | 1/2008 |

* cited by examiner

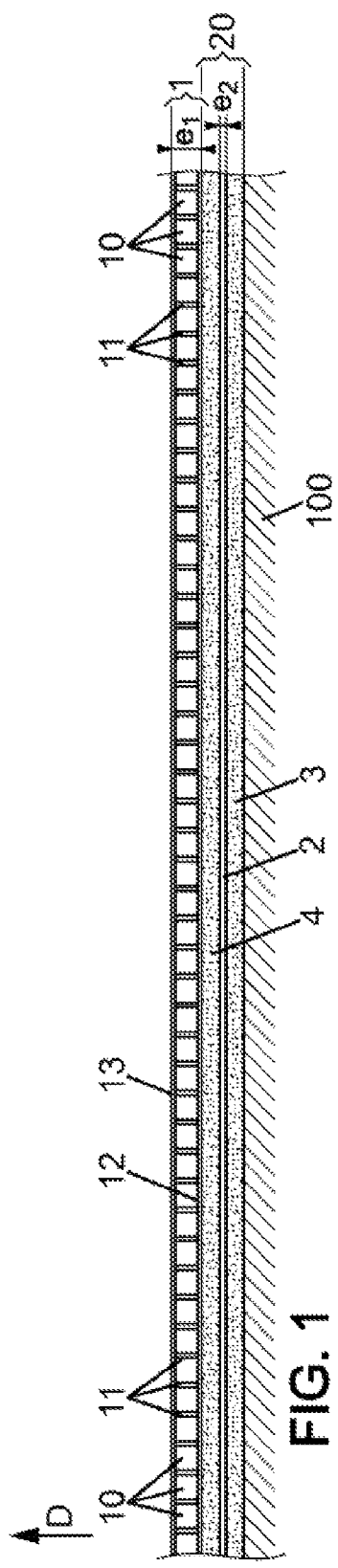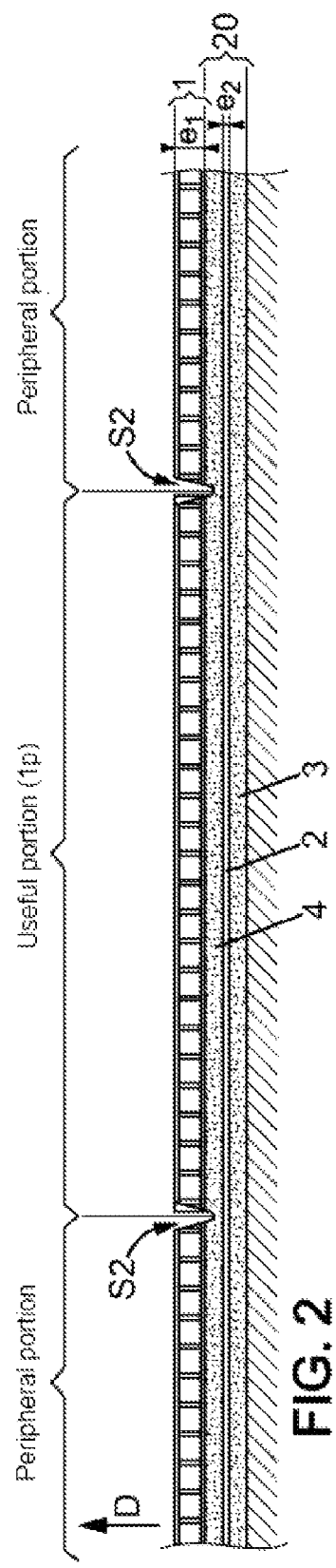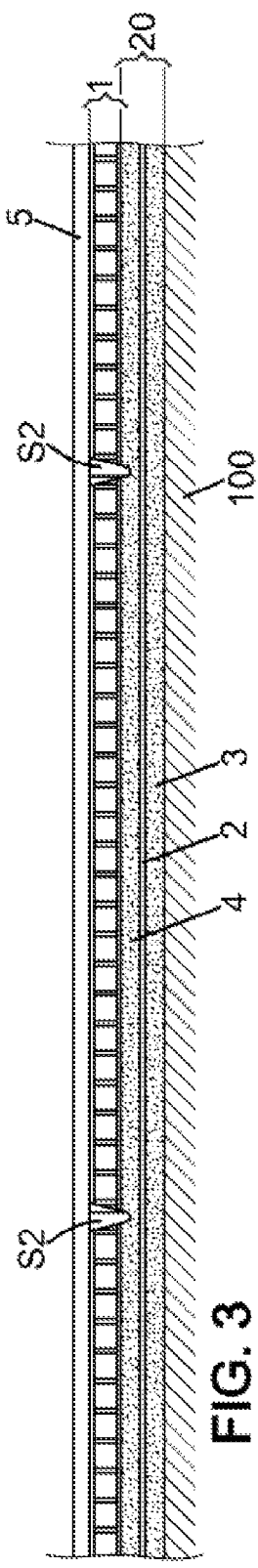

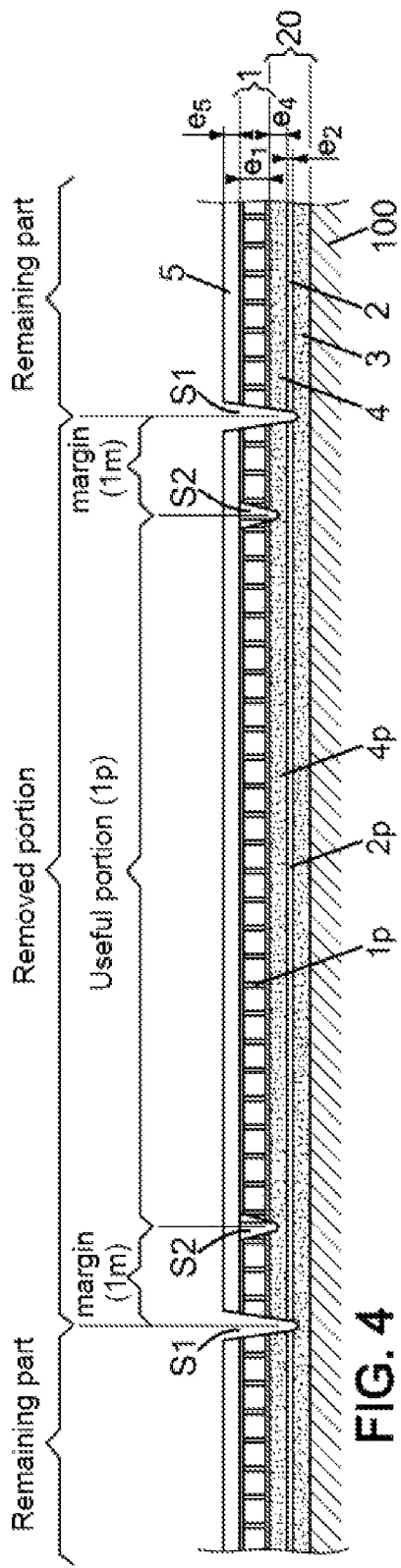
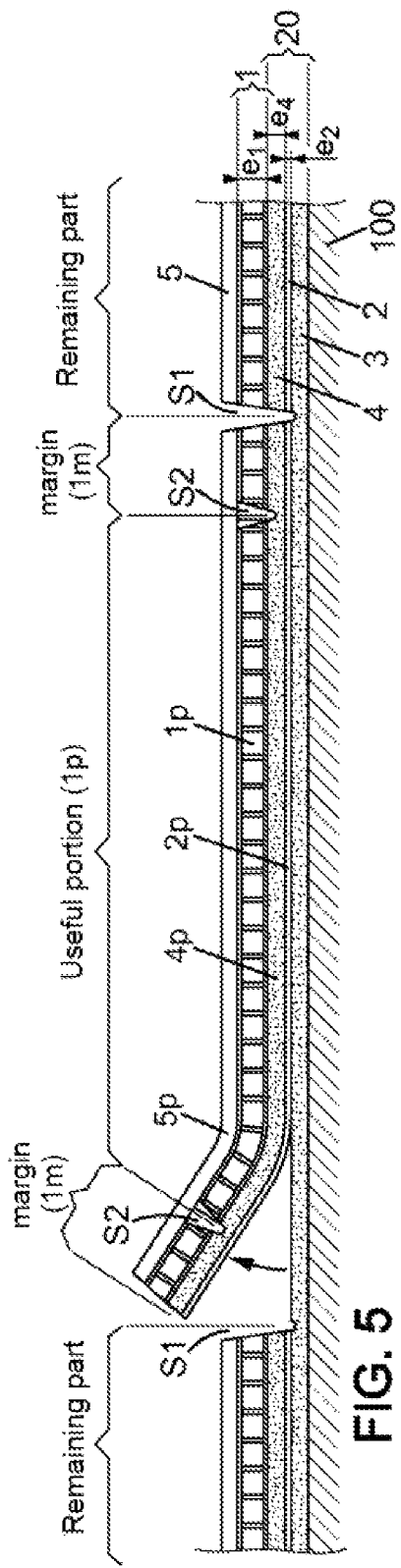

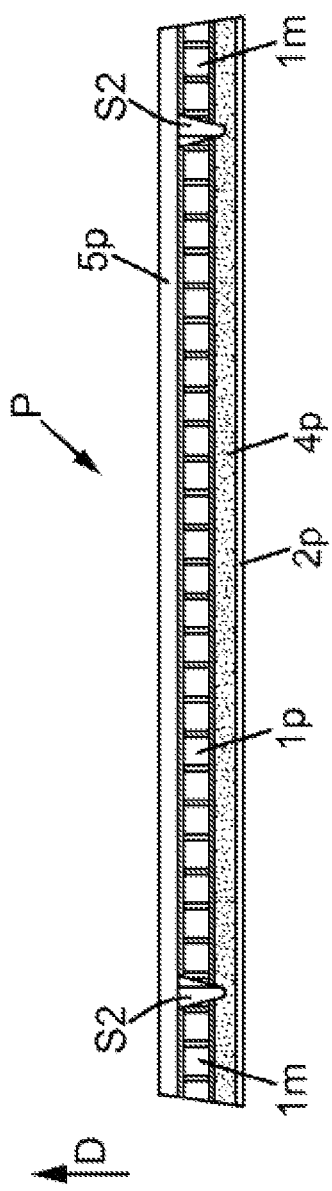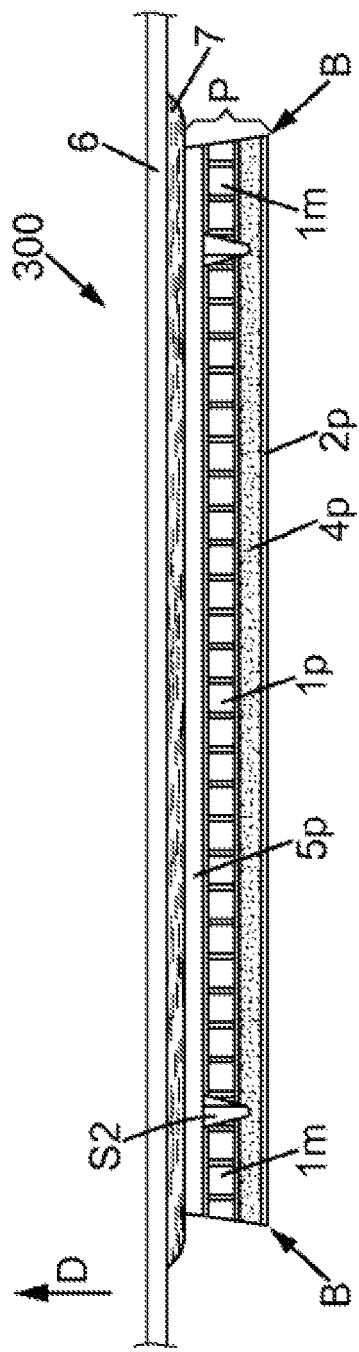

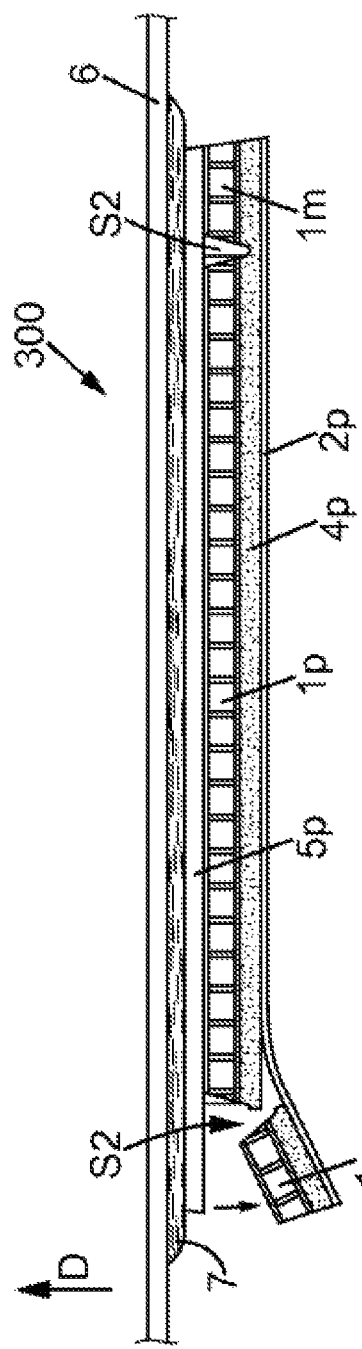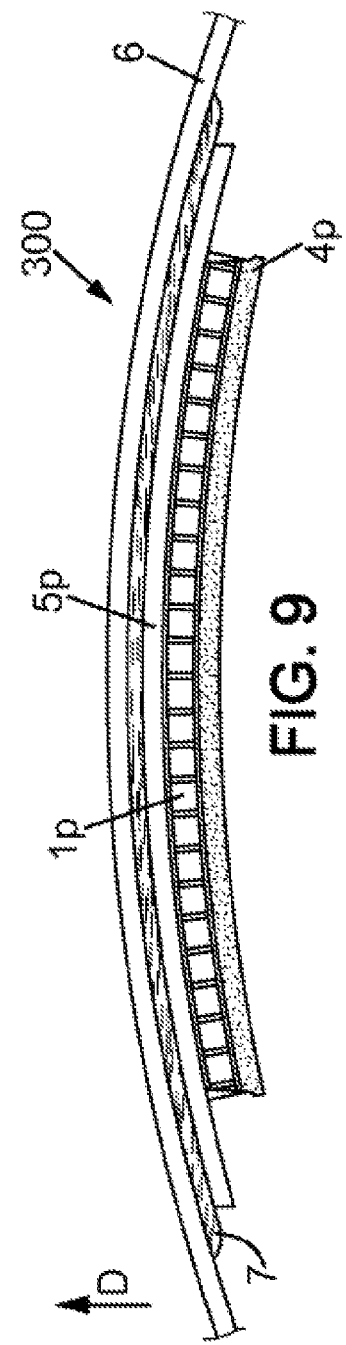

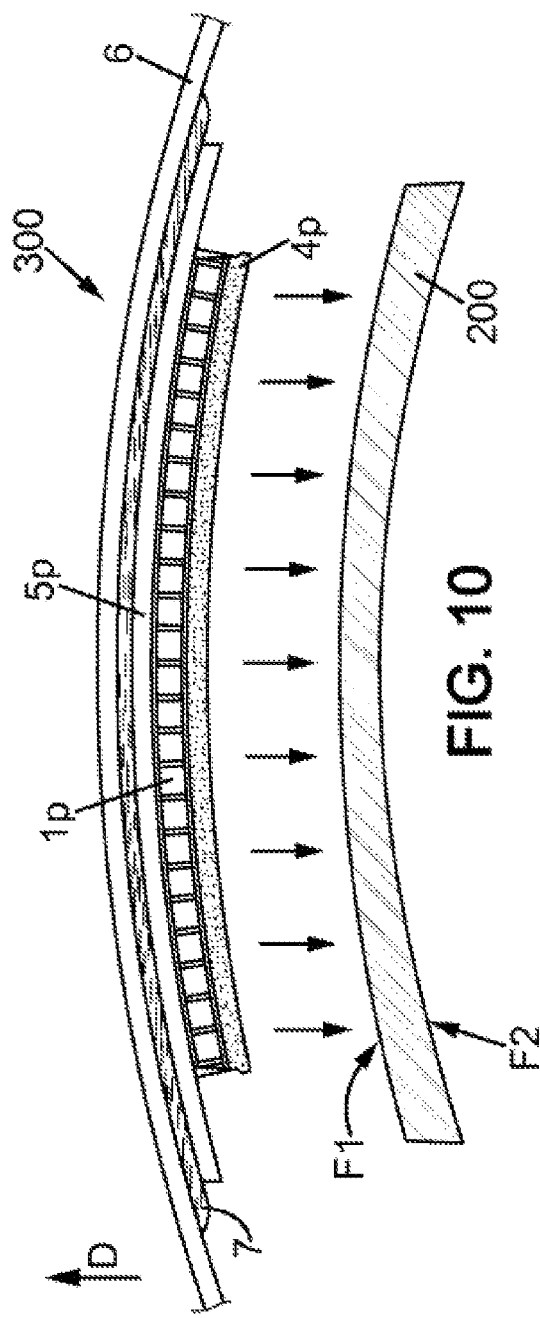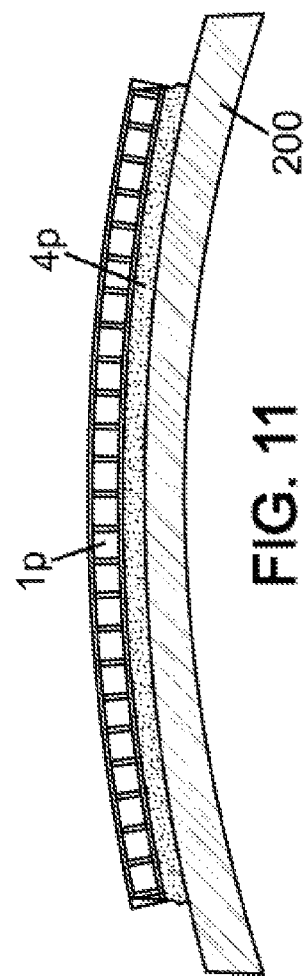

METHOD OF TRANSFERRING A PORTION OF A FUNCTIONAL FILM

CROSS-REFERENCE TO RELATED APPLICATIONS

This application is the National Stage of International Application No. PCT/FR2009/051398, filed on Jul. 13, 2009, which claims the priority of French Patent Application No. 08 54950, filed on Jul. 21, 2008. The contents of both applications are hereby incorporated by reference in their entirety.

The invention relates to a method of transferring a portion of a functional film onto a substrate. It also relates to a multilayer structure which comprises a portion of a functional film, and which is adapted so that this portion can be transferred onto a substrate.

It is often necessary to transfer, onto a final substrate, a portion of film manufactured on a support which will be referred to as the base plate in the rest of this document. Such a transfer dissociates the substrate production from the production of the portion of film, thus increasing the total production yield. This is particularly useful when the production of the film from which the portion is taken is of a more technical nature.

An adhesive layer, such as a layer of pressure sensitive adhesive (PSA), is often used to attach the portion of film to the substrate. Indeed such a layer is easy to implement, inexpensive, and compatible with many of the components that can be used in the film composition. In this case, the film is directly manufactured with the adhesive layer on the base plate. The total production time and final cost price are therefore reduced.

The portion of film can be detached from the base plate by peeling or another method such as the use of a pickup roller, so that a separation occurs at an interface between the portion of film and the base plate, which has a low bonding strength. This separation interface is generally located between the adhesive layer and the base plate, or between the adhesive layer and a separating film which remains on the base plate. The adhesive layer is then exposed after the portion of film has been separated from the base plate, and remains exposed until the portion of film is combined with the substrate. During this time period, dust or various pollutants may become attached to the adhesive layer, and are likely to create defects and/or alter its adhesive strength. It is therefore necessary to take precautions to avoid such defects. Such supplemental precautionary measures are generally costly and reduce the production rate. In addition, they may be incompatible with performing supplemental production steps between the separation of the portion of film from the base plate and its application onto the substrate.

Furthermore, when the portion of film is removed from the base plate, it is gripped by an edge then progressively pulled away from the base plate. This separation method may create defects such as scratches, stretching, marks on the adhesive, compression, or tearing at the location where the separation between the portion of film and the base plate is initiated. Such defects are created no matter what tool is used to grip the edge of the portion of film, particularly when a blade or clamp is used.

The transfer of a portion of film is particularly applicable in the production of eyeglass lenses, or ophthalmic lenses. In this case, the lens is formed from a mass-manufactured substrate onto which is transferred a portion of film that provides a function. For example, the portion of film may give the final lens one or more optical functions such as tint, polarization, anti-glare, UV protection, a photochromic function, optical power, etc. However, the quality requirements are very high for such ophthalmic applications. In particular, dust remaining between the portion of film and the substrate is not acceptable, nor are irregularities at the edge of the portion of film.

One object of the invention is to avoid the creation of such defects.

To achieve this, a first aspect of the invention proposes a method for transferring a portion of a functional film onto a substrate, wherein the functional film is initially retained on a base plate by an adhering structure. This adhering structure comprises:

a separating film,
a first adhesive layer, which holds the separating film on the base plate, and
a second adhesive layer, which holds the functional film on the separating film.

The method comprises the following steps:

/1/ forming a first groove which passes through a thickness of the functional film as well as the thickness of the second adhesive layer around the portion of the functional film which is to be transferred, in order to isolate this portion of the functional film from a remaining part of the functional film, /2/ separating the portion of the functional film from the base plate, and /3/ exposing a portion of the second adhesive layer carried by the portion of the functional film, and applying it to the substrate through the portion of functional film in order to affix the latter onto the substrate.

The method of the invention is characterized in that:

the first groove also passes through a thickness of the separating film, in order to isolate, from a remaining part of the separating film, a portion of this separating film that coincides with the portion of functional film, and a holding of the separating film to the functional film by means of the second adhesive layer is stronger than a holding of the same separating film to the base plate by the first adhesive layer.

The portion of functional film with the portion of separating film is then separated from the base plate in step /2/, the respective portions of functional film and of separating film being held firmly together by the portion of the second adhesive layer. In addition, the portion of the second adhesive layer is exposed at the start of step /3/ by peeling off the portion of separating film.

Thus the two adhesive layers have distinct roles in one method of the invention. The first adhesive layer attaches the assembly comprising the functional film, the second adhesive layer, and the separating film, to the base plate. It can firmly hold this assembly during the time period necessary for manufacturing the functional film, as well as during step /1/ of the transfer process. During step /2/, the interface between the first adhesive layer and the portion of separating film is split, so that the portion of functional film is separated from the base plate. It is separated along with the portion of separating film and the portion of the second adhesive layer situated between them. Such a separation is possible because of the weaker holding of the first adhesive layer compared to that of the second adhesive layer, and because the first groove cuts into both the functional film and the separating film.

The portion of separating film is separated later on from the portion of functional film, by breaking the adhesive bond of the portion of second adhesive layer to the portion of separating film. This removal of the portion of separating film is advantageously performed immediately before applying the portion of second adhesive layer to the substrate, so that the portion of separating film acts to protect the portion of second adhesive layer until its application onto the substrate. In this manner, no dust or pollutant can become attached to the portion of second adhesive layer which will remain in the final assembly between the portion of functional film and the substrate.

The second adhesive layer also ensures the definitive attachment between the substrate and the portion of functional film.

In another characteristic of the invention, a second groove is formed between the first groove and a useful part of the portion of the functional film and of the second adhesive layer, on at least one side of this useful part. This second groove passes through the thickness of the functional film and possibly at least a part of the second adhesive layer, without passing through the thickness of the separating film. It thus isolates a margin of the portion of functional film from the useful part of this portion of functional film. The portion of separating film is then peeled off at the start of step /3/ by gripping it by the margin of the portion of functional film outside the useful part of the portion of functional film. In this manner, no mark from such gripping and no defect is created in the useful part of the portion of functional film during the removal of the portion of separating film. Nor is any defect created in the part of the second adhesive layer which remains in the final assembly between the useful part of the functional film and the substrate.

Such a margin can also eliminate the creation of defects in the useful part of the functional film during step /2/. Indeed, the portion of functional film, or the assembly that consists of the portion of functional film, the portion of separating film, and the intermediate portion of the second adhesive layer, can also be gripped by the margin of the portion of functional film outside the useful part of this portion, during the detachment of the assembly from the base plate. This margin may also be used for writing various information, such as tracking or tracing information for the portion of film. A centering or alignment guide may also be written in the margin, to facilitate and/or guide the placement of the portion of functional film on the substrate or in an instrument used to apply this portion on the substrate.

Thus, the first groove determines the portions of film which are separated from the base plate, and the second groove determines the part of functional film which is ultimately transferred onto the substrate.

The first and second grooves can be made in any order. They can be realized by cutting or digging.

In one special implementation of the invention, the adhesive strength of each adhesive layer onto the separating film can be adjusted by treatments of the separating film. In particular, the separating film may be coated beforehand with silicone on its two opposite faces that then come into contact with the first and second adhesive layers. The same result can be obtained via another method, for example by using a first adhesive layer of a different composition or adhesive strength than the second.

In one improvement of the invention, when the second groove is made before the first groove, an intermediate film may be attached to the face of the functional film that is opposite the base plate. This intermediate film is attached to the functional film between the formation of the two grooves. The first groove which is made in step /1/ then also passes through a thickness of the intermediate film, thus isolating, from a remaining part of the intermediate film, a portion of said intermediate film which coincides with the portion of functional film. In this case, the portion of functional film is separated from the base plate in step /2/ while remaining firmly attached to the portion of intermediate film.

Such an intermediate film may be useful for preforming the portion of functional film before it is applied to the substrate. Such preforming may be used when the substrate has a curved or pseudo-spherical surface, onto which the portion of functional film is applied in step /3/. In the context of the invention, "pseudo-spherical surface" is understood to mean a continuous surface which has no discontinuities, particularly no steps or holes. It can be a flat, spherical, or curved surface with different radii of curvature that are variable along directions perpendicular to each other and tangential to the surface. The preforming may comprise the following steps, which are executed between steps /2/ and /3/:
  connecting the portion of intermediate film to a deformable auxiliary membrane, by a connecting means, then
  deformation of the auxiliary membrane so that the shape of the portion of functional film varies with the deformation of the auxiliary membrane.

In an ophthalmic application of the invention, the substrate may be an ophthalmic lens or a lens blank, and may possibly comprise one or more coatings. In this case, the first and/or second groove may substantially correspond to the shape of an eyeglass lens which is trimmed to fit into an eyeglass frame. The portion of functional film can thus be of a minimal size. This reduces the consumption of functional film. In addition, such a reduction in the size of the portion of functional film can decrease the stresses likely to occur in this portion when it is shaped. Any defects which would be caused by such stresses are reduced accordingly. The invention is also useful for adding functionality to an optical lens of a measuring device, sighting device, camera, or any other device comprising such an optical lens.

A second aspect of the invention also proposes a multilayer structure, comprising, in order along a stacking direction:
  a deformable auxiliary membrane,
  optional connecting means,
  a portion of intermediate film which is connected to the auxiliary membrane by the connecting means,
  a portion of functional film which is solidly fixed to said portion of intermediate film,
  a portion of adhesive layer, and
  a portion of a protective film which is held on the portion of functional film by the portion of adhesive layer, and which is adapted for being removed so as to expose said portion of adhesive layer while the latter remains on the portion of functional film.

The portions of intermediate film, functional film, and protective film have outer peripheral edges which are superimposed in the stack direction.

The portion of functional film additionally has a groove on at least one side. This groove separates a margin from a useful part within this portion of functional film and inside the outer peripheral edge. It passes through a thickness of the portion of functional film and possibly also at least a part of the thickness of the adhesive layer which is present between the functional film and the protective film, but without passing through the thickness of the portion of protective film.

The portions of protective film, adhesive layer, and functional film which pertain to such multilayer structure can be produced as described in accordance with step /1/ of a method according to the first aspect of the invention. The portion of adhesive layer and the portion of protective film comprised in the structure then respectively correspond to the portion of second adhesive layer and the portion of separating film.

The portion of functional film is additionally associated with the deformable auxiliary membrane within the multilayer structure. This assembly can be manufactured independently of the substrate onto which the portion of functional film is to be transferred, at a separate production site, then be provided on demand for assembly with the substrate. It therefore forms an autonomous and separate component which can be stored and possibly reprocessed thanks to the provided protection on the portion of adhesive layer.

It is possible to adapt the connecting means, when present, to allow the portion of intermediate film to slip locally on the auxiliary membrane during a shaping of the multilayer structure. Such connecting means reduce the stresses that are produced in the portion of functional film during the deformation of the auxiliary membrane. Such a phenomenon may also be obtained directly by the functional film, particularly by means of the physical characteristics of the last layer of functional film. "Last layer of functional film" is understood to mean the layer either directly against the deformable auxiliary membrane or directly against the connecting means.

Other features and advantages of the invention will be apparent from the following description of non-limiting examples, with reference to the attached drawings in which:

FIGS. 1 to 11 illustrate the successive steps of a method of the invention,

Figure 12:
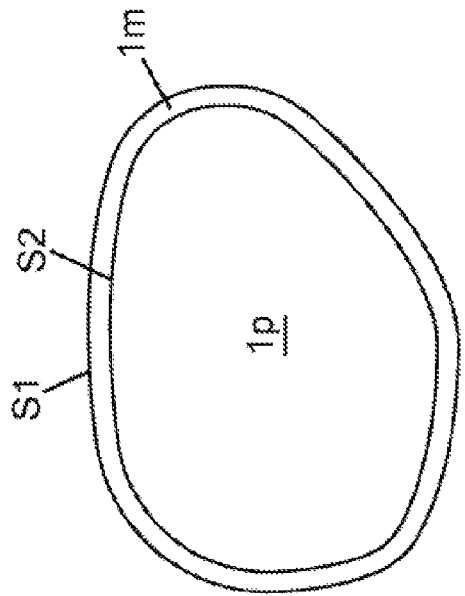
FIG. 12 is an enlarged view of part of FIG. 2, and illustrates an improvement to the invention.

For sake of clarity, the dimensions of the various elements represented in these figures are not proportional to actual dimensions or ratios of dimensions. In addition, same references used in different figures indicate same elements. FIGS. 1 to 12 show cross-sectional views of a multilayer structure of the invention, oriented in the same manner in each figure. In the following description, the expressions "on", "under", "above", "below", "top" and "bottom are relative to this orientation.

The invention is now described to illustrate an ophthalmic application. A portion of functional film is to be transferred from the base plate on which it is manufactured, to a lens substrate. In the figures, the references 1, 100 and 200 respectively indicate the functional film, the base plate, and the substrate.

The base plate 100 may be rigid. In particular, it may be a glass plate of dimensions greater than 32 cm (centimeters)× 38 cm for example.

The substrate 200 may be an ophthalmic lens, which has a convex face F1 and a concave faceF2 (FIG. 10). As an example, the following description relates to a transfer of the portion of the functional film 1 onto the convex face F1 of the lens 200, but a transfer onto the concave face F2 can be done in an analogous manner. Also, the portion of the film 1 can be transferred onto the lens 200 before or after the lens is trimmed to the dimensions of an eyeglass frame. In the first case, the portion of the film 1 will be positioned on the lens 200 in an appropriate manner for the shape and the optical and geometric characteristics of the final glass after it has been trimmed.

As can be seen in FIG. 1, the following layers and films are stacked on the base plate 100, in the stacking direction D starting from the base plate:

a first adhesive layer 3, which may consist of a commercial material such as PSA (Pressure Sensitive Adhesive), a separating film 2, which may be of PET (polyethylene terephthalate), TAC (cellulose triacetate), PVC (polyvinyl chloride), or another standard film compound, and may have a thickness $e_2$ of about 50 μm (micrometers), for example, a second adhesive layer 4, which may be identical to the first adhesive layer 3, and the functional film 1.

The layer 3, the separating film 2, and the layer 4 together form an adhering structure 20 which retains the film 1 on the base plate 100. This structure is realized so that the interface between the separating film 2 and the first adhesive layer 3 has a cohesion which is less than that of the interface between the film 2 and the second adhesive layer 4. In addition, these two interfaces with the separating film 2 are weaker than the other interfaces present in the stack. For example, the interface between the film 2 and the layer 3 may initially have a first release power which is between 4 and 20 g/cm, and the interface between the film 2 and the layer 4 may initially have a second release power of between 12 and 28 g/cm. These release powers are determined according to the international standard MI-47 (FTM4), in a manner which is assumed to be known to a person skilled in the art. In particular, they are determined using a TESA® 7475 tape.

The forces holding the separating film 2 against the functional film 1 by means of the adhesive layer 4, and against the base plate 100 by means of the adhesive layer 3, may be adjusted by appropriately treating the two opposite faces of the film 2. For example, these faces may have been previously coated with an amount of silicone which is greater for the face intended to come into contact with the layer 3. Alternatively, the faces of the film 2 may have been plasma-treated to obtain the desired release powers.

The functional film 1 may be made on demand, according to each eyeglass lens order, or simultaneously for several such orders. The functional film may be a multilayer film comprising, for example, a supporting film of plastic material, such as polyethylene terephthalate, or polycarbonate, coated with one or more layers of materials giving a functionality to the film such as an anti-reflecting or soil-repellent function. The functional film may also comprise a microstructure. For example, in the film 1, there are cells juxtaposed parallel to a surface of the film. Each cell contains a substance with an optical property, selected so that all the cells together give the final lens the desired optical and geometric characteristics. After the substance has been introduced into each cell, the cells are hermetically sealed. The following documents describe this cellular structure as well as methods for filling and closing the cells: US 2006-0006336, WO 2007/132116, and WO 2008/000607. The labels 10, 11, 12, and 13 in FIG. 1 respectively indicate the cells filled with a substance having an optical property, separating walls between the cells, a supporting film for the functional film 1, and a sealing film to seal the cells. In particular, the sealing film 13 is connected to the apexes of the walls 11 in a manner that seals each cell 10. The total thickness of the functional film 1 is denoted $e_1$.

It is possible for the functional film 1 to comprise additional coatings on its upper face, such as an anti-reflecting coating, soil-repellent coating, etc., or a combination of these or other coatings typical of an ophthalmic application for example.

A groove S2 is then formed in the functional film 1, while this latter film is maintained on the base plate 100 by the adhering structure 20 (FIG. 2). The groove S2 isolates a useful portion of the film 1, denoted 1p, from a peripheral portion of the film 1 which surrounds the useful portion. To this purpose, the groove S2 is formed in the stack starting from the side which is opposite the base plate 100. It may be realized using an engraving tip, or by directing an engraving laser beam onto the stack, parallel and in the opposite direction to the direction D. The groove S2 is engraved so that it passes completely through the thickness $e_1$ of the functional film 1 as well as possibly through a portion of the thickness $e_4$ of the adhesive layer 4, without passing through the separating film 2. In other words, the film 2 remains continuous below the groove S2. Preferably the groove S2 passes through the entire thickness $e_4$ of the adhesive layer 4.

The useful portion 1p of the functional film 1 which is isolated by the groove S2 advantageously corresponds to the final shape of the trimmed lens. "Corresponds to the final shape of the trimmed lens" is understood to mean a coincidence between the respective peripheral edges of the portion 1p and the lens after it has been trimmed. To this purpose, the groove S2 may be traced on the film 1 while taking into account possible shrinkage or expansion of the portion 1p which could occur during the subsequent steps of the method, before the useful portion 1p is assembled with the substrate 200.

FIG. 12 illustrates an improvement of the invention for forming the groove S2. In addition to the groove S2 which cuts through the functional film 1, a peripheral sealing strip 8 may be placed inside the groove S2, along one side of it against the useful portion 1p. The strip 8 encloses the useful portion 1p and forms a permanent sealing connection between the supporting film 12 and the sealing film 13. In this manner, the cells 10 which the groove S2 passes through are laterally sealed. The strip 8 may consist of the same material as the films 12 and 13, for example PET, in order to firmly adhere to them. The substance contained in the cells 10 the groove S2 passes through therefore remains contained within them, preserving the optical properties of the useful portion 1p out to the peripheral edge. The strip 8 only fills part of the groove S2, so that the additional part of the groove S2 which remains unfilled still passes through the entire thickness $e_1$ of the functional film 1. The useful portion 1p, supplemented by the sealing strip 8, therefore remains isolated from the peripheral portion of the film 1 by means of the groove S2.

An intermediate film 5 is then applied to the stack (FIG. 3). The intermediate film 5 continuously covers the groove S2 and the useful portion 1p. It may be selected so that it is easily removed at a later time, by peeling it off for example. Until such a removal has been performed, the intermediate film 5 remains firmly attached to the functional film 1. However, the use of the intermediate film 5 is not indispensable to the invention.

Figure 13A:
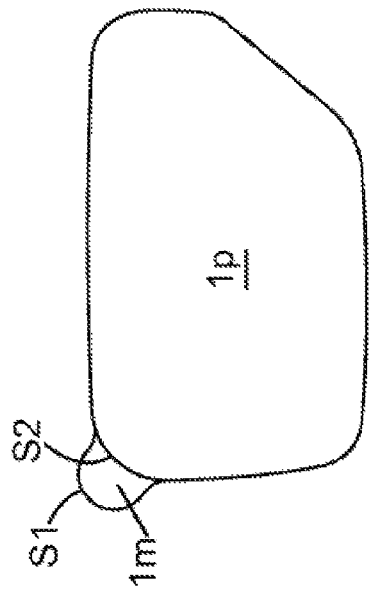
FIGS. 13a and 13b represent two possible shapes for the portion of functional film, appropriate for an ophthalmic application of the invention.
Figure 13B:
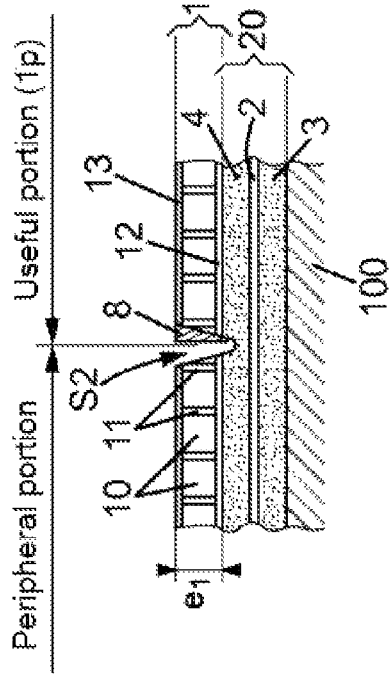

Next another groove is formed, denoted S1 in FIG. 4, around the useful portion 1p of the functional film. The groove S1 may be superimposed on the groove S2, or be separated from this latter groove and closer to the outside of the useful portion 1p, in a manner which may be dependent upon the location around the portion 1p. FIG. 13a shows a first possible configuration, in which the two grooves S1 and S2 are substantially parallel all the way around the useful portion 1p. FIG. 13b shows a second possible configuration, in which they are combined except in a short segment of the groove S2. The groove S1 determines the portion of the functional film 1 which will be removed from the base plate 100, relative to a remaining portion of the film 1. This portion which is to be removed from the plate 100 is labeled the "removed portion" in FIG. 4. It comprises the useful portion 1p as well as a margin 1m which is contained between the grooves S1 and S2. The margin 1m is separated from the useful portion 1p by the groove S2, but is connected to it by means of the separating film 2. In the configuration of FIG. 13a, the margin 1m forms a ring around the useful portion 1p, with the width of the ring being substantially constant. In the configuration of FIG. 13b, the margin 1m is reduced to a tab placed at an angle of the useful part 1p. It is possible for the margin 1m to form a ring surrounding the useful portion 1p, but with the width of this ring locally increased to form a tab for gripping.

The groove S1 may be realized using an engraving technique similar to the one used for the groove S2, but adjusting the engraving parameters. Unlike the groove S2, the groove S1 is formed so that it passes both through the functional film 1 and the separating film 2. If applicable, the groove S2 also passes through the intermediate film 5. In other words, the depth of the groove S2 is at least equal to the sum of the thickness $e_1$ of the film 1, the thickness $e_4$ of the second adhesive layer 4, the thickness $e_2$ of the separating film 2, and if applicable the thickness $e_5$ of the intermediate film 5. Under these conditions, the groove S1 simultaneously isolates the removed portion of functional film 1, as well as the corresponding portions of the adhesive layer 4 and separating film 2. These portions of the layer 4 and film 2 are denoted 4p and 2p respectively.

The inventors indicate that the groove S2 which was formed first is not indispensable to the transfer of the portion of functional film onto the substrate 200. In this case, the groove S1, which passes through the films 1 and 2, itself determines the useful portion 1p of the functional film 1. It is then identical to the portion which will be removed from the base plate 100. In this case of a single groove S1, it may be advantageous to provide again a sealing strip 8 in order to seal the cells 10 of the useful portion 1p which are traversed by the groove S1. Conversely, when a groove S2 is used to define the useful portion 1p independently of the groove S1 which defines the removed part, it is not necessary to provide a lateral seal for the cells 10 on the outer edge of the removed portion, corresponding to the groove S1.

The portion of functional film 1 which is isolated by the groove S1 is detached from the base plate 100 (FIG. 5). It comprises the useful portion 1p and the margin 1m, connected to each other by the portion 2p of the separating film 2. For the detachment, the margin 1m is lifted, for example using a blade which is slid into the groove S1 against the margin 1m. The margin 1m is then taken hold of and progressively pulled in a manner that peels off the useful portion 1p by detaching it from the base plate 100. Given that the groove S1 also passes through the separating film 2, and that the adhesion is weakest at the interface between the film 2 and the first adhesive layer 3, the separation occurs at this interface. Thus the respective portions 2p and 4p of the separating film 2 and the second adhesive layer 4 are removed at the same time as the portions 1m and 1p. The portion 5p of the intermediate film 5, if applicable, is also removed simultaneously. The remaining parts of the films 1, 2 and 5, as well as the layer 4, remain on the base plate 100.

FIG. 6 represents the removed stack portion which has been separated in this manner from the base plate 100. This stack portion, referred to as P, is autonomous and can be easily transported or stored. The portion 2p of the separating film then acts to protect the portion 4p of the adhesive layer 4 against accidental attachments of foreign particles. When a useful part of the stack portion P has been defined by a specific groove S2, this groove S2 is limited by the portion 2p of separating film, and is limited at the top by the portion 5p of intermediate film if such exists.

It is possible to preform the stack portion P, particularly for application onto the curved face F1 of the substrate 200. During the preforming, it may be supported by a deformable auxiliary membrane, which is held in place by its peripheral edge and shaped by applying a pressure differential between the two sides of this membrane. The stack portion P then itself changes in shape, in accordance with the shape change of the auxiliary membrane. No marks from gripping or tools are therefore created on the stack portion P.

It may also be advantageous to attach the stack portion P to the auxiliary membrane by connecting means which are adapted to allow the intermediate film to slip locally on the auxiliary membrane. This can reduce the stresses likely to occur in the portion $1p$ of functional film during shaping. The connecting means may be a layer of an adhesive viscoelastic material or a capillary liquid layer of appropriate viscosity and/or surface tension. In particular, the connecting means may be a layer of PSA material that is 25 μm thick. The auxiliary membrane may be of PET, of an appropriate thickness for the desired deformation.

FIG. 7 represents the stack portion P, after it has been associated with the deformable auxiliary membrane 6 by the connecting means 7. The multilayer structure formed in this manner is labeled 300. It may be produced at a dedicated production site, then stored and transported to the location where it is assembled with the substrate 200. In this case, the auxiliary membrane 6 may comprise a written reference concerning the portion of functional film $1p$, and/or concerning the production site for the multilayer structure.

FIG. 8 represents the preparation step for the multilayer structure 300 which exposes the useful portion of the adhesive layer $4p$ necessary to achieve the final assembly with the substrate 200. The portion $4p$ of the second adhesive layer which is comprised in the multilayer structure 300 is uncovered. To do so, the portion $2p$ of the separating film is peeled off by gripping it at the margin $1m$. A blade is first inserted at the edge B between the margin $1m$ and the portion $5p$ in order to separate them from each other. Then the parts of the portion $2p$ and the margin $1m$ separated in this manner from the portion $5p$ are gripped with a clamp and pulled, bringing along the entire portion $2p$. This avoids the creation of any marks from tools on the useful portion of functional film $1p$ or on the second adhesive layer $4p$ remaining in contact with the functional film $1p$. When the line of detachment between the portion of functional film and the portion $5p$ of intermediate film reaches the groove S2, the detachment continues at the interface between the portion $4p$ of adhesive layer and the portion $2p$ of separating film. Thus only the portion $2p$ of separating film directly below the useful portion $1p$ of functional film is removed, and the functional film remains covered by the portion $4p$ of adhesive layer.

FIG. 9 represents the multilayer structure 300 after it has been shaped. A preforming method as described in documents WO 2006/105999, WO 2007/133208, or WO 2007/144308, may be used. In particular, the multilayer structure 300 may be heated for easier shaping.

The portion $4p$ of adhesive layer is then applied to the face F1 of the substrate 200, by means of the auxiliary membrane 6, the connecting means 7, the portion $5p$, and the useful portion $1p$ of the functional film (FIG. 10). The material of the layer 4 is selected to provide strong adhesion to the substrate 200, in order to produce a definitive assembly.

Lastly, the auxiliary membrane 6 is separated from the portion $1p$ of the functional film. To this purpose, it may be peeled off by separating the connecting means 7. Preferably the portion $5p$ of intermediate film is also removed by separating its connecting interface from the portion $1p$. The portion $5p$ can thus be removed, particularly when the film 5 is not transparent and/or it fulfills no function in the final eyeglass lens. In this case, the function of the portion $5p$ of intermediate film is to allow the portion $1p$ to slip relative to the membrane 6 during the preforming, in conjunction with the connecting means 7. It also avoids the diffusion of molecules from the connecting means 7 into the portion $1p$ of functional film, generating visible defects in the final lens.

FIG. 11 illustrates the final configuration of the lens 200. The useful portion $1p$ of the functional film is attached to the lens 200 by the portion $4p$ of adhesive layer. Because of the invention, the portion $1p$ has no defect which could be visible in the final eyeglass lens. The lens is therefore of a quality which is compatible with the criteria of an ophthalmic application. The lens 200 may, as represented in FIG. 11, be of greater dimensions than the useful portion $1p$ of the functional film, but may also have identical or smaller dimensions than said useful portion $1p$. The choice of comparative size of the lens 200 relative to the comparative size of the useful portion $1p$ is made based on the intended use of the final assembly, taking into account the nature of the constituting materials of the substrate 200 and of the functional film, as well as the surface and the geometry of the final assembly.

The margin $1m$ of the portion of functional film which is cut with the useful part $1p$ may be used to write various data concerning the useful part. Such data may comprise a serial number, a production date and/or site, data on chemical composition, etc. In this manner, these data which are useful during the production of the lens do not remain on the final product and its aesthetics are not impacted.

This margin $1m$ around the useful part $1p$ may also be used to provide centering marks. Such marks are useful during preforming of the portion of functional film 1 and/or assembling it with the substrate 200, and/or mounting it in a tool used for such performing and/or assembly. They may consist of lines pointing in multiple directions which are intended to be aligned or superimposed with other lines on the substrate 200 or the preforming or assembly tool. The marks written on the margin $1m$ are removed with it, so that they no longer appear in the final eyeglass lens.

It is understood that modifications and adaptations can be introduced to the above implementations of the invention, while retaining at least some of the advantages mentioned. One such advantage is that the useful portion of the functional film may be transferred to the substrate without leaving marks on it. In particular, it can be manipulated without directly gripping it with tools. In addition, the portion of functional film which is transferred may be integrated into a multilayer structure, between its separation from a support used for its manufacture and its attachment to the final substrate. This multilayer structure protects the portion of functional film and an adhesive portion used for the assembly with the substrate. In addition, it is compatible with the use of a preforming step.

The invention claimed is:

1. A method for transferring a portion of a functional film onto a substrate, the functional film being initially retained on a base plate by an adhering structure comprising:
 a separating film,
 a first adhesive layer, which holds the separating film on the base plate, and
 a second adhesive layer, which holds the functional film on the separating film, said method comprising the following steps:
 /1/ forming a first groove which passes through a thickness of the functional film around the portion of said functional film, so as to isolate said portion of the functional film from a remaining part of said functional film,
 /2/ separating the portion of the functional film from the base plate, and
 /3/ exposing a portion of the second adhesive layer carried by the portion of the functional film, and applying said portion of the second adhesive layer onto the substrate through the portion of functional film in order to affix said portion of the functional film to said substrate, wherein:

the first groove additionally passes through a thickness of the separating film so as to isolate, from a remaining part of said separating film, a portion of said separating film that coincides with the portion of the functional film, and a holding of the separating film to the functional film by means of the second adhesive layer is stronger than a holding of said separating film to the base plate by the first adhesive layer, so that the portion of the functional film with the portion of separating film is separated from the base plate in step /2/, said respective portions of the functional film and separating film being held firmly together by the portion of the second adhesive layer, and the portion of the second adhesive layer is exposed at the start of step /3/ by peeling off the portion of separating film, and the method additionally comprising a formation of a second groove between the first groove and a useful part of the portion of the functional film, on at least one side of said portion of functional film, said second groove passing through the thickness of the functional film and possibly at least a part of the second adhesive layer, without passing through the thickness of the separating film, and isolating a margin of the portion of the functional film from said useful part of the portion of the functional film, and the portion of separating film is peeled off at the start of step /3/ by gripping said portion of separating film by the margin of the portion of the functional film outside the useful part of said portion of the functional film, wherein said second groove is formed before said first groove, and an intermediate film is attached to the functional film between the respective formation of the second and first grooves, on one face of said functional film opposite the base plate, said first groove additionally passing through a thickness of the intermediate film so as to isolate, from a remaining part of said intermediate film, a portion of said intermediate film coinciding with the portion of the functional film, and the portion of the functional film being separated from the base plate in step /2/ while solidly attached to the portion of intermediate film.

2. A method according to claim 1, wherein a first interface between the separating film and the first adhesive layer within the adhering structure initially has a first release power of between 4 and 20 g/cm, and a second interface between said separating film and the second adhesive layer within said adhering structure initially has a second release power of between 12 and 28 g/cm, said release powers being determined according to the MI-47 standard.

3. A method according to claim 1, wherein the separating film is coated beforehand with silicone on two opposite faces of said separating film, said two faces subsequently being in contact with the first and the second adhesive layer respectively.

4. A method according to claim 1, wherein the portion of the functional film is separated from the base plate in step /2/ by gripping said portion of the functional film by the margin, outside the useful part of said portion of functional film.

5. A method according to claim 1, additionally comprising the following steps executed between steps /2/ and /3/:

connecting the portion of intermediate film to a deformable auxiliary membrane by a connecting means, peeling off the portion of separating film by gripping said portion of separating film by the margin of the portion of the functional film outside the useful part of said portion of the functional film, then deformation of the auxiliary membrane such that the shape of the portion of the functional film varies with the deformation of said auxiliary membrane.

6. A method according to claim 1, wherein the substrate is an ophthalmic lens.

7. A method according to claim 6, wherein the first or the second groove substantially corresponds to a shape of an eyeglass lens trimmed to fit into an eyeglass frame.

8. A method according to claim 1, wherein the functional film comprises cells that are juxtaposed parallel to a surface of said functional film, said cells being hermetically sealed and each containing a substance with an optical property.

9. A method according to claim 1, wherein the functional film represents a multilayer film comprising a supporting film of plastic material, coated with one or more layers of materials giving a functionality to said film.

* * * * *